US012705158B2

(12) United States Patent
de Bruyn

(10) Patent No.: US 12,705,158 B2
(45) Date of Patent: Aug. 11, 2026

(54) SYSTEMS AND METHODS FOR A SHARED COMMON MICROSERVICE

(71) Applicant: Capital One Services, LLC, McLean, VA (US)

(72) Inventor: Carel de Bruyn, Prosper, TX (US)

(73) Assignee: Capital One Services, LLC, McLean, VA (US)

( * ) Notice: Subject to any disclaimer, the term of this patent is extended or adjusted under 35 U.S.C. 154(b) by 405 days.

(21) Appl. No.: 18/405,774

(22) Filed: Jan. 5, 2024

(65) Prior Publication Data

US 2025/0225046 A1 Jul. 10, 2025

(51) Int. Cl.

| | |
|---|---|
| ***G06F 15/16*** | (2006.01) |
| ***G06F 11/32*** | (2006.01) |
| ***G06F 11/34*** | (2006.01) |

(52) U.S. Cl.
CPC ........ *G06F 11/3433* (2013.01); *G06F 11/327* (2013.01); *G06F 11/3409* (2013.01)

(58) Field of Classification Search
CPC . G06F 11/3433; G06F 11/327; G06F 11/3409
USPC .................................. 709/201–203, 217–229
See application file for complete search history.

(56) References Cited

U.S. PATENT DOCUMENTS

| | | | | |
|---|---|---|---|---|
| 8,712,804 | B2 * | 4/2014 | Wottowa | G06Q 40/06 705/30 |
| 11,245,592 | B1 * | 2/2022 | Thomson | G06F 9/44505 |
| 11,360,760 | B2 * | 6/2022 | Keyser | H04L 67/306 |
| 11,360,825 | B2 * | 6/2022 | Chen | H04L 45/46 |
| 11,671,316 | B2 * | 6/2023 | Singh | G06Q 50/60 709/220 |
| 11,892,931 | B2 * | 2/2024 | Borkar | G06F 11/3409 |
| 12,169,727 | B2 * | 12/2024 | Lokesharadhya | G06F 9/5088 |
| 12,328,225 | B2 * | 6/2025 | Singh | G06F 11/3006 |
| 12,443,459 | B2 * | 10/2025 | Singh | G06F 9/5088 |
| 2020/0233656 | A1 * | 7/2020 | Keyser | G06F 16/128 |
| 2021/0182117 | A1 * | 6/2021 | Chen | H04L 47/83 |
| 2021/0319151 | A1 * | 10/2021 | Chen | G06F 30/20 |
| 2022/0222097 | A1 * | 7/2022 | Lokesharadhya | G06F 11/3433 |
| 2022/0365859 | A1 * | 11/2022 | Borkar | G06F 3/1454 |
| 2022/0417090 | A1 * | 12/2022 | Singh | G06F 11/3006 |
| 2023/0385930 | A1 * | 11/2023 | Rasori | G06Q 40/03 |
| 2024/0095111 | A1 * | 3/2024 | Chawla | G06F 11/079 |
| 2024/0097974 | A1 * | 3/2024 | Singh | H04L 12/66 |

(Continued)

*Primary Examiner* — Moustafa M Meky
(74) *Attorney, Agent, or Firm* — Foley & Lardner LLP

(57) ABSTRACT

Systems and methods for a shared common microservice. In some aspects, the system may receive a domain model. The domain model may include a resource module and a service module. The system may receive, from a user device, a first request. The first request may include a first set of resources and a first task to be completed. The system may retrieve, from the domain model, a required set of resources corresponding to the first set of resources that a first API requires access to complete the first task. Based on the required set of resources from the domain model, the system may generate a template for the first API. Based on the template, the system may generate a first endpoint for the first API. The system may deploy the first endpoint. The first API accesses one or more microservice functions at the execution of the first task.

20 Claims, 6 Drawing Sheets

(56) References Cited

U.S. PATENT DOCUMENTS

2024/0107344 A1* 3/2024 Papanikitas ......... G06F 11/3409
2025/0279932 A1* 9/2025 Singh ...................... H04L 12/66

* cited by examiner

SYSTEMS AND METHODS FOR A SHARED COMMON MICROSERVICE

SUMMARY

A microservice is a software architectural style that structures an application as a collection of modular components or services. Each module supports a specific task and can use a simple, well-defined interface, such as an application programming interface (API) to communicate with other sets of services. Using a microservice allows systems to enable fast development and deployment cycles because teams can work on and deploy individual microservices independently. However, doing so can lead to duplication of model classes of dependency APIs. This can result in various issues that negatively impact the overall system's performance. For example, maintaining multiple sets of model classes can be time consuming. In another example, having duplicate model classes of dependency APIs causes data inconsistencies. For instance, when updating the schema of an API, the system has to update all corresponding duplicate model classes. If all duplicate model classes are not updated, there is a high risk of introducing bugs to the application. Overall, these issues lead to increased development time to fix bugs or write additional mapping or conversion code to translate between different representations of the same data. These technical problems may present an inherent problem with attempting to use microservices.

Accordingly, methods and systems are described herein for a shared common microservice. As one example, methods and systems are described herein to enable developers to deploy new instances that depend on a shared common microservice. This involves a process for automated generation of an API endpoint, a data access layer, and any other common non-business logic functionality for a new instance deployed pointing to a domain model.

In some embodiments, for a first domain model, a new instance is deployed pointing to the first domain model which generates API endpoint(s), the data access layer, and any other common non-business logic functionality for the first domain model. For a second domain model, a new instance is deployed pointing to the second domain model which generates API endpoint(s), the data access layer, and any other common non-business logic functionality for the second domain model. The first domain model and the second domain model may not overlap; however, the running instances may overlap due to the functionality in the common microservice. In some embodiments, the first domain model may depend on the second domain model (or vice versa) by calling the API endpoint(s) of the second domain model.

In some embodiments, the non-business logic functionality of the shared common microservice includes seamless inter domain model communication. This may be achieved by adding the dependent domain model's shared model classes (e.g., the second domain model's shared classes) as a dependency to the microservice instance (e.g., the first domain model's microservice instance) and using a functionality, provided by the shared common microservice, that abstracts the API call in such a way that it appears in the code that there is no API call at all. Domain model shared classes may not contain business logic.

In some embodiments, the shared common microservice has the overlapping (e.g., non-business logic) functionality and the domain model has the business logic functionality. However, extensions may be required if the common microservice does not contain non-business logic functionality needed by a specific domain model, in which case the new microservice instance for that domain model can be extended by pointing to one or more shared microservice extensions. While extensions are not part of the common microservice or domain model, extensions can be shared (e.g., because they do not contain business logic) with other instances of the common microservice for domain models that might also need that non-business logic functionality.

For example, when deploying a new instance of the common microservice, it will point to the domain model (e.g., the business logic for that specific instance), optionally point to the shared classes of dependency domain models (e.g., does not contain any business logic) for seamless communication between microservice instances, and optionally point to microservice extensions (e.g., any non-business logic required by the domain model not currently provided by the common microservice). As a result, the common microservice provides auto API endpoints, auto data access layer, seamless communication, and any other common non-business logic functionality.

Existing systems do not contemplate or provide for developers to deploy new instances that depend on a shared common microservice. To overcome these technical deficiencies in existing systems for this practical benefit, methods and systems disclosed herein retrieve a required set of resources from a domain model to complete a first task. Based on the required set of resources from the domain model to complete the first task, the system may generate a template for the first API and generate an API endpoint based on the template. The API endpoint can be used to receive the first type of an item. For example, the API endpoint can receive the model type of a specific car. The system may receive another task to complete. The system may determine whether the second set of resources to complete the second task overlaps within a threshold with the first set of resources. In response to determining the second set of resources is overlapping within the threshold with the first set of resources, the system may extend the instance of the shared common microservice to point to a microservice extension. The microservice extension can assist to complete the second task. Accordingly, the methods and systems allow users to create and deploy new instances of the shared common microservice easily and quickly.

In some aspects, the problems described above may be solved using a system that may perform the following operations. The system may receive a domain model. The domain model may include a resource module and a service module. The service module includes code for microservice functions for the domain model. The system may receive, from a user device, a first request. The first request may include a first set of resources and a first task to be completed. The system may retrieve, from the domain model, a required set of resources corresponding to the first set of resources that a first API requires access to complete the first task. The first API is configured to complete the first task. Based on the required set of resources from the domain model, the system may generate a template for the first API. Based on the template, the system may generate a first endpoint for the first API for providing input to the first API. The system may deploy the first endpoint for the first API to complete the first task. The first API accesses one or more microservice functions from the service module at the execution of the first task. The system may receive, from the user device, a second request. The second request may include a second set of resources and a second task to be completed. The second set of resources is overlapping within a threshold to the first set of resources. Finally, based on the second request, the system may generate a microservice extension. The microservice extension supplements the first API to complete the second task. Supplementing the first API may include generating a second endpoint for the first API and updating a data access layer.

The system may receive a first request. In particular, the system may receive, from a user device, a first request. The first request may include a first set of resources and a first task to be completed. For example, the system may receive a first request from a user device to deploy an instance of the shared common microservice to complete a first task. For instance, the first task can refer to determining the weather in the user's location. The first request may include the first set of resources such as access to a database that records the weather.

The system may retrieve a required set of the resources. In particular, the system may retrieve, from the domain model, a required set of resources corresponding to the first set of resources that a first API requires access to complete the first task. The first API is configured to complete the first task. For example, the system may determine the first API needs access to the database with weather data.

The system may generate a template for the first API. In particular, based on the required set of resources from the domain model, the system may generate a template for the first API. For example, based on the required resources, the system may generate a first API that accesses the database to retrieve the weather data needed to complete the first task.

The system may generate a first endpoint. In particular, based on the template, the system may generate a first endpoint for the first API for providing input to the first API. For example, the system may receive input from the user. For instance, the user may provide input such as their location.

The system may deploy the first endpoint for the first API. In particular, the system may deploy the first endpoint for the first API to complete the first task. The first API accesses one or more microservice functions from the service module at the execution of the first task. For example, the first API may transmit to the user the temperature in the user's location.

The system may receive a second request. In particular, the system may receive, from the user device, a second request. The second request may include a second set of resources and a second task to be completed. The second set of resources overlaps within a threshold to the first set of resources. For example, the system may receive a second task to determine the weather in the nearest major city to the user's location.

The system may generate a microservice extension. In particular, based on the second request, the system may generate a microservice extension. The microservice extension supplements the first API to complete the second task. Supplementing the first API may include generating a second endpoint for the first API and updating a data access layer. For example, the system may update the first API to complete the second task.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
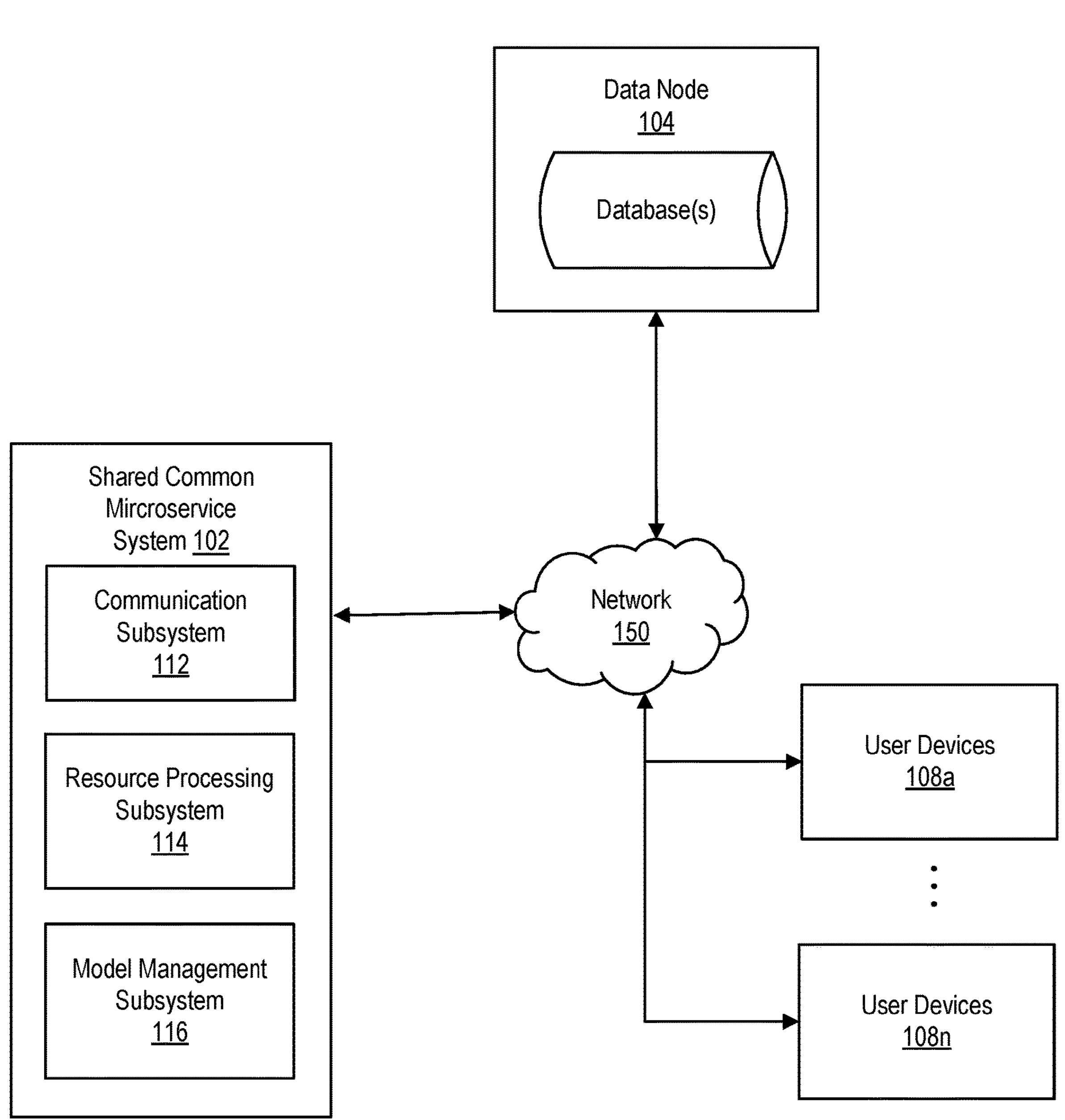
FIG. 1 shows an illustrative diagram for a shared common microservice, in accordance with one or more embodiments.

FIG. 1 shows an illustrative environment for a shared common microservice, in accordance with one or more embodiments of this disclosure. Environment 100 includes shared common microservice system 102, data node 104, and user devices **108*a*-108*n***.

Figure 2A:
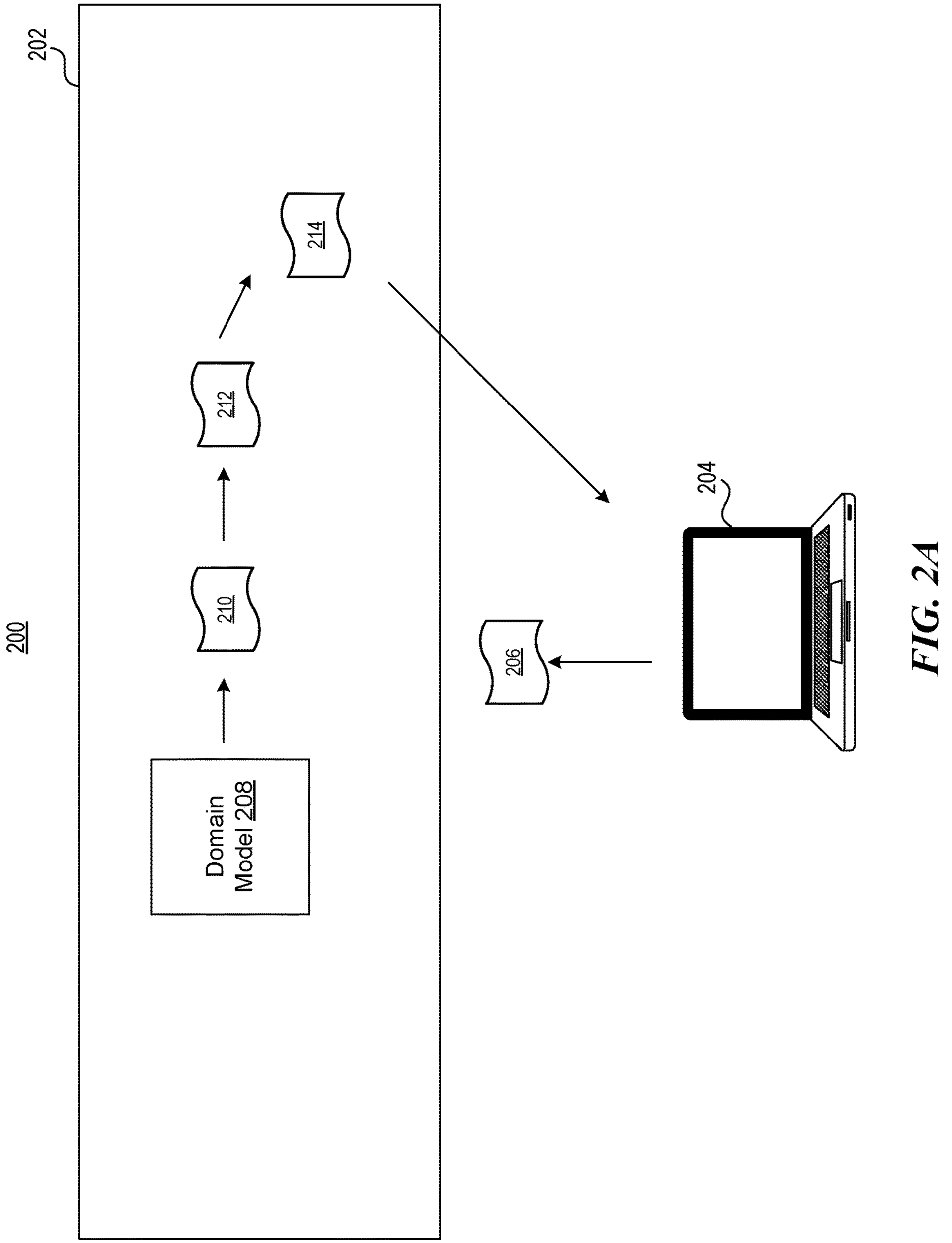
FIG. 2A and FIG. 2B show illustrative diagrams for generating a microservice extension, in accordance with one or more embodiments.

Shared common microservice system 102 may include software, hardware, or a combination of both and may reside on a physical server or a virtual server running on a physical computer system (e.g., centralized server 202 described with respect to FIG. 2A). In some embodiments, shared common microservice system 102 may be configured on a user device (e.g., a laptop computer, a smartphone, a desktop computer, an electronic tablet, or another suitable user device). Furthermore, shared common microservice system 102 may reside on a cloud-based system and/or interface with computer models either directly or indirectly, for example, through network 150. Shared common microservice system 102 may include communication subsystem 112, resource processing subsystem 114, and/or model management subsystem 116.

Data node 104 may store various data, including one or more machine learning models, training data, user data profiles, input data, output data, performance data, and/or other suitable data. Data node 104 may include software, hardware, or a combination of the two. In some embodiments, shared common microservice system 102 and data node 104 may reside on the same hardware and/or the same virtual server or computing device. Network 150 may be a local area network, a wide area network (e.g., the Internet), or a combination of the two.

User devices **108*a*-108*n*** may include software, hardware, or a combination of the two. For example, each user device may include software executed on the device or may include hardware such as a physical device. User devices may include user devices (e.g., a laptop computer, a smartphone, a desktop computer, an electronic tablet, or another suitable user device).

Shared common microservice system 102 may receive requests from one or more user devices. Shared common microservice system 102 may receive data using communication subsystem 112, which may include software components, hardware components, or a combination of both. For example, communication subsystem 112 may include a network card (e.g., a wireless network card and/or a wired network card) that is associated with software to drive the card and enables communication with network 150. In some embodiments, communication subsystem 112 may also receive data from and/or communicate with data node 104 or another computing device. Communication subsystem 112 may receive data associated with the domain model. Communication subsystem 112 may communicate with resource processing subsystem 114 and model management subsystem 116.

Shared common microservice system 102 may include resource processing subsystem 114. Communication subsystem 112 may pass at least a portion of the data or a pointer to the data in memory to resource processing subsystem 114. Resource processing subsystem 114 may include software components, hardware components, or a combination of both. For example, resource processing subsystem 114 may include software components that are able to execute operations for retrieving and mapping resources. Resource processing subsystem 114 may access data, such as resources needed for an API. Resource processing subsystem 114 may directly access data or nodes associated with user devices 108*a*-108*n* and may transmit data to these user devices. Resource processing subsystem 114 may, additionally or alternatively, receive data from and/or send data to communication subsystem 112 and model management subsystem 116.

Model management subsystem 116 may execute tasks relating to managing instances of the shared common microservice and APIs. Model management subsystem 116 may include software components, hardware components, or a combination of both. For example, in some embodiments, model management subsystem 116 may deploy an API endpoint. Model management subsystem 116 may allow shared common microservice system 102 to improve the process of deploying instances of the shared common microservice by automatically generating a template based on the resources retrieved from the domain model, in accordance with one or more embodiments. Model management subsystem 116 may, additionally or alternatively, receive data from and/or send data to communication subsystem 112 or resource processing subsystem 114.

Figure 2B:
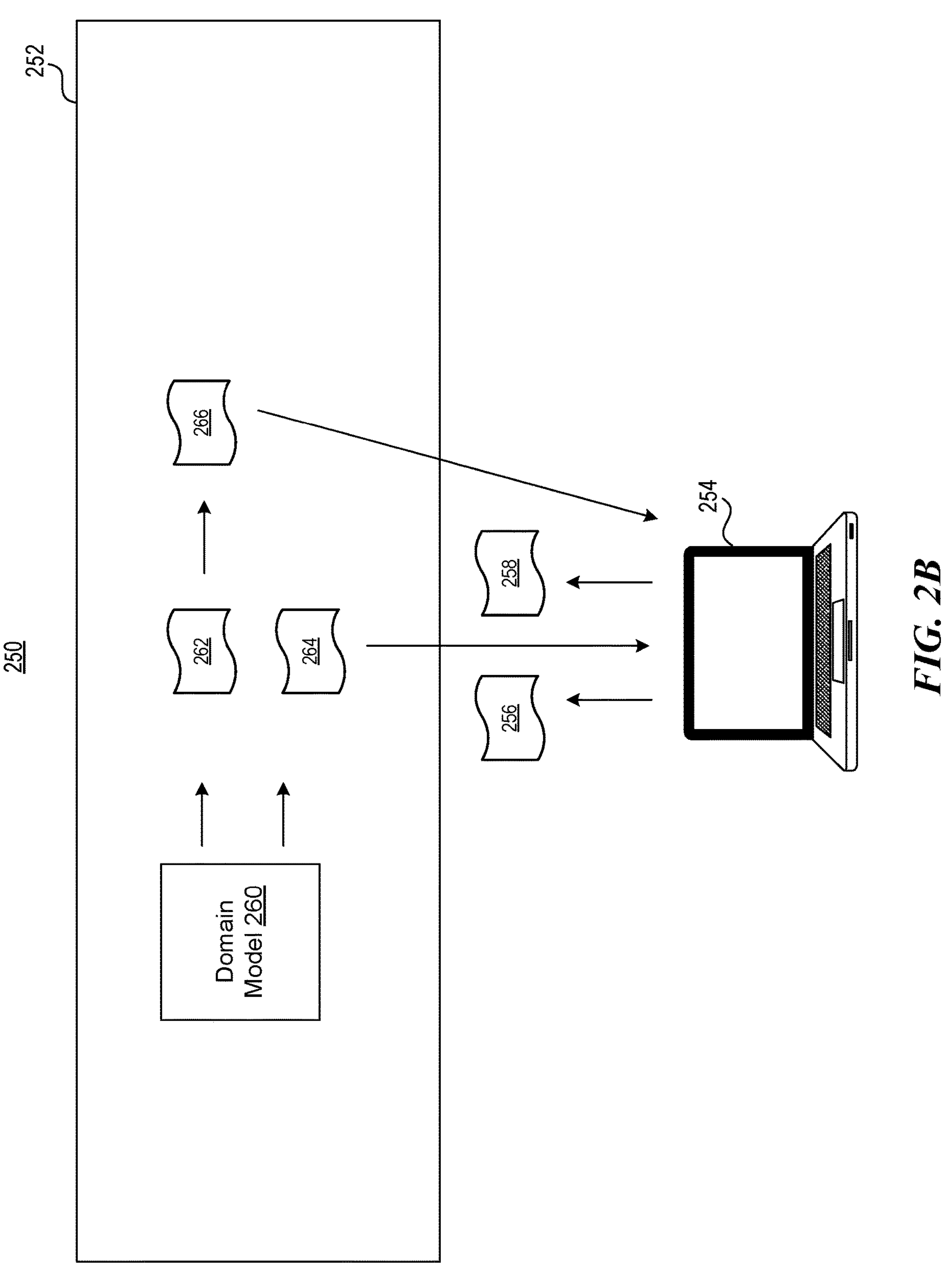

FIGS. 2A and 2B show illustrative diagrams for generating a microservice extension, in accordance with one or more embodiments. FIG. 2A shows environment 200. Environment 200 includes server 202, user device 204, request 206, domain model 208, resources 210, template 212, and endpoint 214.

Server 202 may receive a domain model (e.g., domain model 208). In particular, server 202 may receive a domain model. The domain model may include a resource module and a service module. The service module includes code for microservice functions for the domain model.

Server 202 may receive a request (e.g., request 206). In particular, server 202 may receive, from a user device (e.g., user device 204), a first request (e.g., request 206). The first request (e.g., request 206) may include a first set of resources and a first task to be completed. For example, the system may receive request 206 to determine a loan amount for purchasing a vehicle. Request 206 may include all relevant details of the purchase (e.g., a first set of resources) and the task to determine the amount a bank would loan the user for the purchase (e.g., the task).

Server 202 may retrieve a set of resources (e.g., resources 210). In particular, server 202 may retrieve, from the domain model (e.g., domain model 208), a required set of resources (e.g., resources 210) corresponding to the first set of resources that a first API requires access to complete the first task. The first API is configured to complete the first task. For example, the system may retrieve from domain model 208 the details relevant for the purchase such as the type of vehicle and the user's credit history. The system may receive access to the databases that store the data associated with the vehicle purchase.

Server 202 may generate a template (e.g., template 212) for the first API. In particular, based on the required set of resources from the domain model, server 202 may generate a template for the first API (e.g., template 212). For example, after receiving request 206, the system may, based on the required set of resources 210, generate a template 212 for an API.

Server 202 may generate a first endpoint (e.g., endpoint 214). In particular, based on the template (e.g., template), server 202 may generate a first endpoint for the first API (e.g., endpoint 214). For example, the system may retrieve the required set of resources 210 needed for template 212 to generate API endpoint 214. For example, a user may want to use the system to determine a loan offer for a vehicle purchase. Template 212 may store the types of required resources 210. Based on the resources 210, the system is able to generate endpoint 214. Thus, the system may generate API endpoints based on the types of features present in the API.

In some embodiments, server 202 may identify and validate resources based on the first set of resources (e.g., resources 210). Server 202 may identify and validate resources based on the first set of resources (e.g., resources 210). The first set of resources may include resource identifiers and parameters for the first request (e.g., request 206). In some embodiments, when identifying and validating resources, server 202 may determine a type of resource as an object resource, a singleton resource, or a functional resource. Server 202 may extract the resource identifiers and parameters for the first request (e.g., request 206) from the first set of resources (e.g., resources 210). Based on the resource identifiers and parameters for the first request (e.g., request 206), server 202 may generate the first endpoint (e.g., endpoint 214) according to a predefined configuration from the template. Server 202 may transmit first API requests based on the first request (e.g., request 206) and parse first API responses for retrieved data. Server 202 may map the retrieved data to the resource module. For example, the system may identify each resource in resources 210. Then, the system may validate that each resource is accurate. For example, if a parameter of a resource is to be in string format, the system may validate the resource is in string format.

Server 202 may deploy the first endpoint (e.g., endpoint 214). In particular, server 202 may deploy the first endpoint for the first API to complete the first task (e.g., endpoint 214). The first API accesses one or more microservice functions from the service module at the execution of the first task. In some embodiments, when deploying the first API to access the service module to complete the first task, server 202 may retrieve predefined processing rules for requests from the user device. For example, a developer may deploy the first endpoint 214 for users to utilize.

FIG. 2B shows environment 250. Environment 250 includes server 252, user device 254, request 256, request 258, domain model 260, resources 262, resources 264, and microservice extension 266.

In some embodiments, server 202 may generate a microservice extension (e.g., microservice extension 266). In particular, server 202 may receive, from the user device (e.g., user device 254), a second request (e.g., request 258). The second request (e.g., request 258) may include a second set of resources (e.g., resources 264) and a second task to be completed. The second set of resources (e.g., resources 264) is overlapping within a threshold to the first set of resources (e.g., resources 262). Based on the second request (e.g., request 258), server 202 may generate a microservice extension (e.g., microservice extension 266). The microservice extension (e.g., microservice extension 266) supplements the first API to complete the second task. Supplementing the first API may include generating a second endpoint for the first API and updating a data access layer. For example, the system may receive a new request to determine a loan offer for a different purchase. In response to determining the new request is similar to the first request, the system may update the first API by generating a microservice extension. By doing so, the system is able to utilize the existing resources for new requests. In some embodiments, server 202 may determine a threshold for resource similarity. The threshold may include a level of similarity that indicates when a set of resources (e.g., resources 264) should be utilized to generate a microservice extension (e.g., microservice extension 266). For example, the system may generate a similarity metric such as cosine similarity, Jaccard similarity, Euclidean distance, or neural-network based methods to determine a threshold for resource similarity.

In some embodiments, server 202 may deploy a second API. In particular, server 202 may receive, from the user device, a third request. The third request may include a third set of resources and a third task to be completed. The third set of resources does not overlap within a threshold from the first set of resources (e.g., resources 262). Based on the required set of resources from the domain model (e.g., domain model 260), server 202 may generate an endpoint for a second API for the third request. Server 202 may deploy the second API to access the service module to complete the third task. The second API and the first API communicate with each other. For example, the system may receive a new third request to run a background check on a user. The system may determine the resources for the third request do not overlap with the resources 262 for the first request 206. After that, the system may determine the third request needs access to a database with user information. Finally, the system may generate an endpoint for the third request and deploy the new API.

In some embodiments, server 202 may remove a duplicate set of resources. In response to deploying the second API, server 202 may analyze associated resource identifiers and parameters to assess a similarity between the first set of resources (e.g., resources 262) and the second set of resources (e.g., resources 264). Based on the analysis, server 202 may detect a duplicate set of resources. In response to detecting the duplicate set of resources, server 202 may remove the duplicate set of resources. In some embodiments, when removing the duplicate set of resources, server 202 may update the second API by removing the endpoint for a second API and updating the associated resource identifiers and parameters. For example, the system may determine both the first API and second API utilize the same data in two identical databases. In response, the system may remove the identical database and update the corresponding API.

In some embodiments, server 202 may generate a first notification. In particular, server 202 may generate a first test. The first test verifies the system generates a first response for the first request. In response to verifying the system generates the first response, server 202 may verify the system generates a second response for the second request (e.g., request 258). Server 202 may generate a second test. The second test verifies both the first API and a second API access the service module. In response to determining the first API or the second API does not access the service module, server 202 may generate a first notification to the user device (e.g., user device 254). The first notification may include results of the second test. For example, a developer may test the shared microservice system. For instance, the developer may test whether the first request returns an offer amount for the first request and a different amount for the second request. The developer may test whether the responses change in accordance with changes made to the domain model. If the system determines the API is not accessing the domain model, the system may generate a notification to indicate that to all users using the deployed API.

In some embodiments, server 202 may generate a second notification. In particular, server 202 may generate a first test. The first test verifies the system generates a first response for the first request. In response to verifying the system generates the first response, server 202 may verify the system generates a second response for the second request (e.g., request 258). Server 202 may compare the first response and the second response. In response to determining the first response and second response are identical, server 202 may generate a second notification to the user device (e.g., user device 254). The second notification may include the results of the comparison. For example, the system may determine the same results are being produced by the different APIs. In response, the system generates a notification indicating that the deployed APIs are identical. By doing so, the developer can determine whether to utilize both APIs or to remove one.

In some embodiments, server 202 may collect real-time performance metrics. In particular, server 202 may transmit a command to collect real-time performance metrics. The real-time performance metrics may include response times, error rates, and utilization rate. Based on the performance metrics not reaching a threshold, server 202 may generate an alert.

Figure 3:
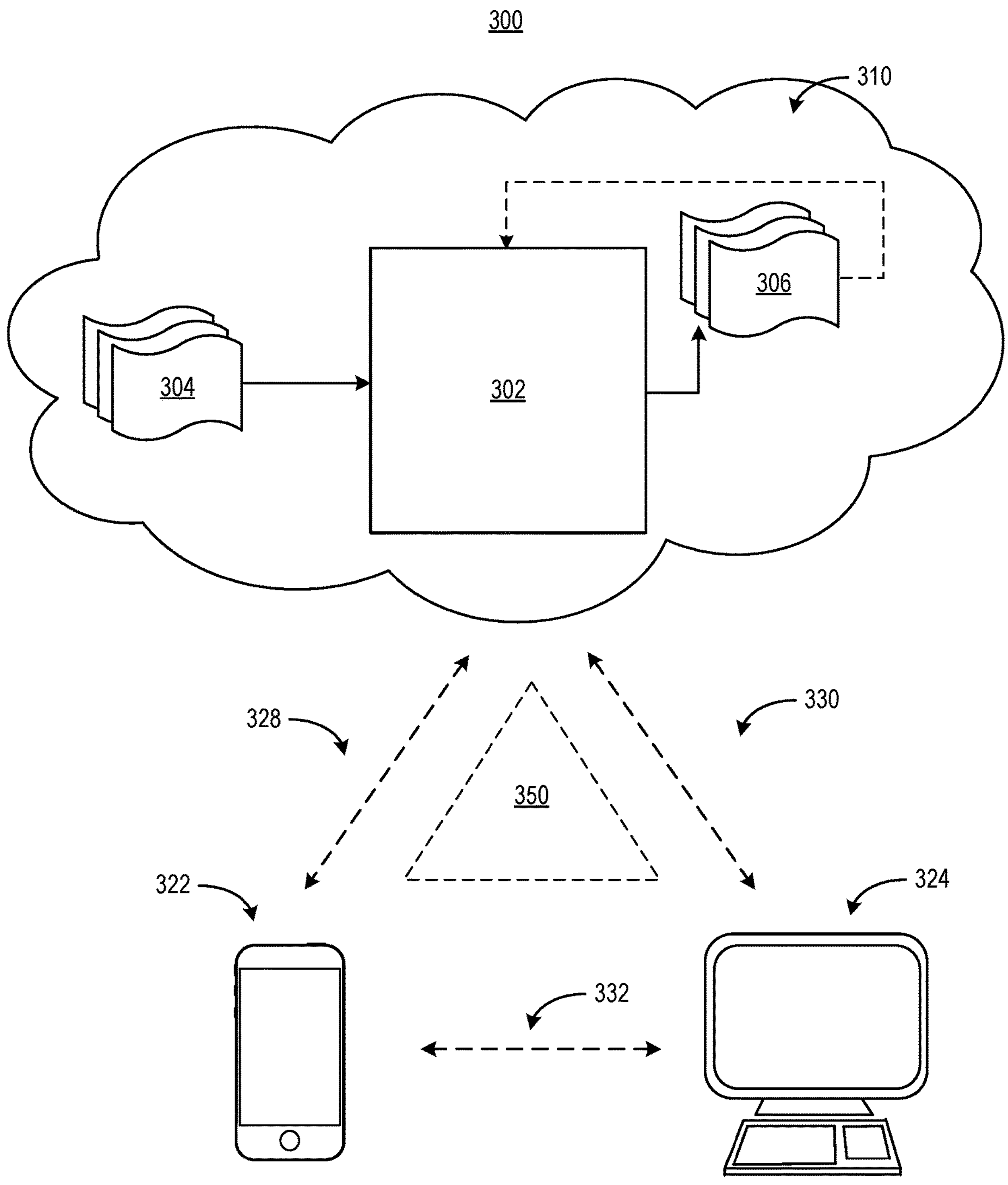
FIG. 3 shows illustrative components for a system used to a shared common microservice, in accordance with one or more embodiments.

FIG. 3 shows illustrative components for a system used for a shared common microservice, in accordance with one or more embodiments. For example, FIG. 3 may show illustrative components for allowing users to deploy new instances of the shared common microservice easily and quickly. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components

310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include shared common microservice system 102, communication subsystem 112, resource processing subsystem 114, model management subsystem 116, data node 104, or user devices **108*a*-108*n*, and may be connected to network 150. Cloud components 310 may include program 302, which may be a machine learning model, artificial intelligence model, etc., (which may be referred to collectively as "models" herein). Program 302 may take input 304 and provide output 306. The input may include metadata about an API. The metadata may include information about the API. The output may include a template data structure. The template data structure may include the type of data needed for the API. In some embodiments, output 306 may be fed back to program 302 as another input to program 302** (e.g., alone or in conjunction with other inputs such as information from the API source repository). For example, the system may receive updated metadata from the API source repository to generate an updated template data structure.

In another embodiment, program 302 may receive a user request to generate an API endpoint for the API (e.g., input 304). Program 302 may generate a static response to the request (e.g., output 306). In a variety of embodiments, program 302 may update its configurations (e.g., the virtualized API endpoint) based on updated metadata (e.g., input 304).

In some embodiments, the program (e.g., program 302) may automatically perform actions based on outputs 306. In some embodiments, the model (e.g., program 302) may not perform any actions. The output of the program (e.g., program 302) may be used to allow users to easily and quickly deploy new instances of the shared common microservice.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of their operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

The system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
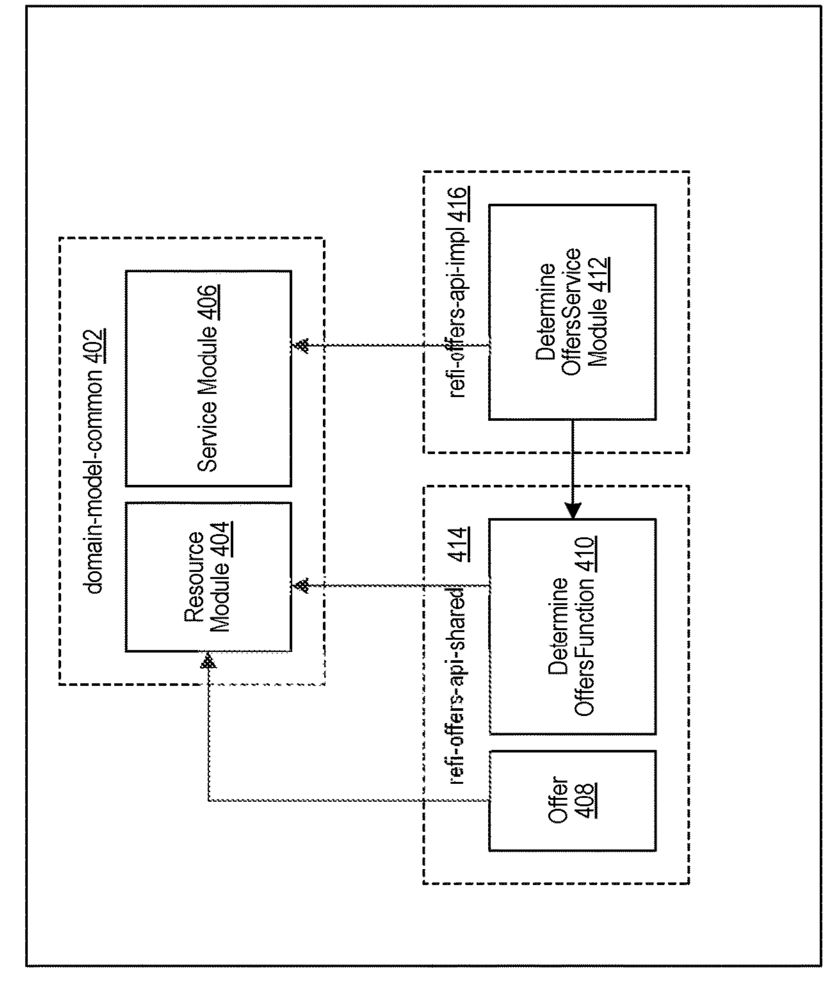
FIG. 4 shows an illustrative diagram for a shared common microservice, in accordance with one or more embodiments.

FIG. 4 shows an illustrative diagram for a shared common microservice, in accordance with one or more embodiments. FIG. 4 illustrates diagram 400. Diagram 400 includes domain model 402, resource module 404, service module 406, offer 408, function 410, service module 412, API 414, and API endpoint 416. For example, the system may retrieve, from a domain model 402, a required set of resources corresponding to the first set of resources that a first API requires access to complete the first task. The first API may be configured to complete the first task. The domain model 402 may include resource module 404 and service module 406. Based on the required set of resources from the domain model 402 (e.g., resource module 404), the system may generate a template for API 414. Based on the template, the system may generate a first endpoint 416 for API 414. The system may deploy the first endpoint 416 for API 414 to complete the first task. The first API may access one or more microservice functions from service module 406 at the execution of the first task.

Figure 5:
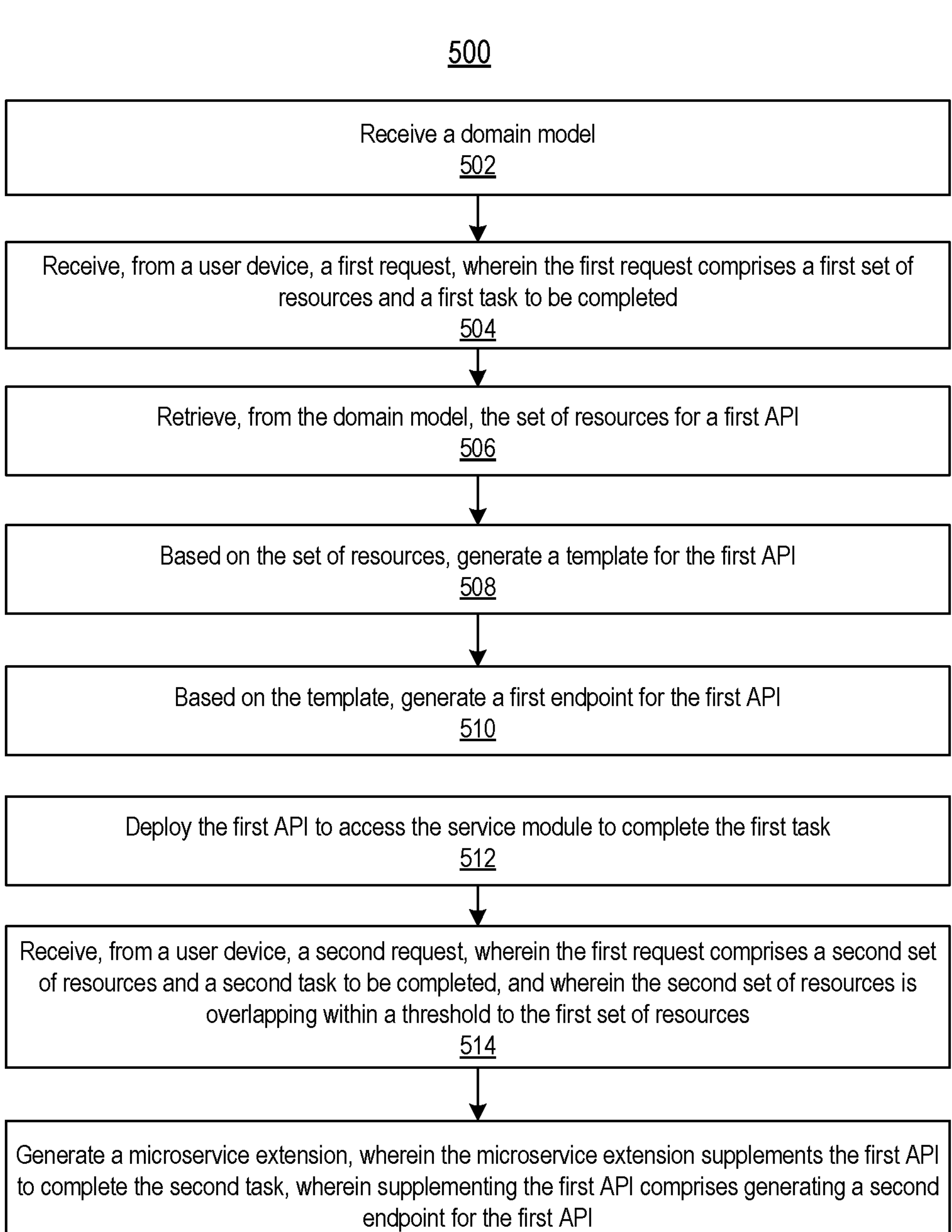
FIG. 5 shows a flowchart of the steps involved for a shared common microservice, in accordance with one or more embodiments.

FIG. 5 shows a flowchart of the steps involved for a shared common microservice, in accordance with one or more embodiments. For example, the system may use process 500 (e.g., as implemented on one or more system components described above) in order to allow users to deploy new instances of the shared common microservice easily and quickly.

At operation 502, process 500 (e.g., using one or more components described above) may receive a domain model (e.g., domain model 208, domain model 260, or domain model 402). For example, server 202 may receive a domain model (e.g., domain model 208, domain model 260, or domain model 402). The domain model (e.g., domain model 208, domain model 260, or domain model 402) may include a resource module (e.g., resource module 404) and a service module (e.g., service module 406). The service module (e.g., service module 406) includes code for microservice functions for the domain model (e.g., domain model 208, domain model 260, or domain model 402). For example, communication subsystem 112 may receive a domain model 208 using communication paths 328, 330, and 332. The domain model 208 may include a resource module and a service module. The service module includes code for microservice functions for the domain model (e.g., domain model 208).

At operation 504, process 500 (e.g., using one or more components described above) may receive, from a user device (e.g., user device 204 or user device 254), a first request (e.g., request 206 or request 256). The first request (e.g., request 206 or request 256) may include a first set of resources and a first task to be completed. For example, communication subsystem 112 may receive, from a user device 204, a first request 206 using communication paths 328, 330, and 332. The first request 206 may include a first set of resources and a first task to be completed.

At operation 506, process 500 (e.g., using one or more components described above) may retrieve from the domain model (e.g., domain model 208, domain model 260, or domain model 402), a set of resources (e.g., resources 210). For example, the system may retrieve, from the domain model (e.g., domain model 208), a required set of resources (e.g., resources 210) corresponding to the first set of resources that a first API requires access to complete the first task. The first API is configured to complete the first task. For example, resource processing subsystem 114 may retrieve, from the domain model 208, a required set of resources 210 corresponding to the first set of resources (e.g., resources 210 or resources 262) that a first API requires access to complete the first task using communication paths 328, 330, and 332. The first API is configured to complete the first task.

At operation 508, process 500 (e.g., using one or more components described above) may, based on the required set of resources from the domain model, generate a template for the first API (e.g., template 212). For example, model management subsystem 116 may, based on the required set of resources from the domain model (e.g., domain model 208, domain model 260, or domain model 402), generate a template 212 for the first API.

At operation 510, process 500 (e.g., using one or more components described above) based on the template (e.g., template 212), may generate a first endpoint for the first API (e.g., endpoint 214). For example, based on template 212, model management subsystem 116 may generate a first endpoint 214 for the first API.

In some embodiments, the system may identify and validate resources based on the first set of resources (e.g., resources 210). For example, resource processing subsystem 114 may identify and validate resources based on the first set of resources (e.g., resources 210). The first set of resources may include resource identifiers and parameters for the first request (e.g., request 206). In some embodiments, when identifying and validating resources, resource processing subsystem 114 may determine a type of resource as an object resource, a singleton resource, or a functional resource. Communication subsystem 112 may extract the resource identifiers and parameters for the first request (e.g., request 206) from the first set of resources (e.g., resources 210 or resources 262) using communication paths 328, 330, and 332. Based on the resource identifiers and parameters for the first request (e.g., request 206 or request 256), model management subsystem 116 may generate the first endpoint according to a predefined configuration from the template (e.g., template 212). Communication subsystem 112 may transmit first API requests based on the first request and parse first API responses for retrieved data using communication paths 328, 330, and 332. Resource processing subsystem 114 may map the retrieved data to the resource module (e.g., resource module 404).

At operation 512, process 500 (e.g., using one or more components described above) may deploy the first endpoint for the first API to complete the first task (e.g., endpoint 214). For example, the system may deploy the first endpoint for the first API to complete the first task (e.g., endpoint 214). The first API accesses one or more microservice functions from the service module at the execution of the first task. For example, model management subsystem 116 may deploy the first endpoint 214 for the first API to complete the first task. The first API accesses one or more microservice functions from the service module at the execution of the first task. In some embodiments, when deploying the first API to access the service module (e.g., service module 406) to complete the first task, communication subsystem 112 may retrieve predefined processing rules for requests from the user device using communication paths 328, 330, and 332.

At operation 514, process 500 (e.g., using one or more components described above) may receive, from the user device (e.g., user device 254), a second request (e.g., request 258). The second request (e.g., request 258) may include a second set of resources (e.g., resources 264) and a second task to be completed. The second set of resources (e.g., resources 264) is overlapping within a threshold to the first set of resources (e.g., resources 262). For example, communication subsystem 112 may receive, from the user device 254, a second request 258 using communication paths 328, 330, and 332. The second request 258 may include a second set of resources 264 and a second task to be completed. The second set of resources 264 is overlapping within a threshold to the first set of resources 262.

At operation 516, process 500 (e.g., using one or more components described above) may generate a microservice extension (e.g., microservice extension 266). The microservice extension (e.g., microservice extension 266) supplements the first API to complete the second task. Supplementing the first API comprises generating a second endpoint for the first API. For example, based on the second request (e.g., request 258), the system may generate a microservice extension (e.g., microservice extension 266). The microservice extension (e.g., microservice extension 266) supplements the first API to complete the second task. Supplementing the first API comprises generating a second endpoint for the first API. For example, based on the second request 258, resource processing subsystem 114 may generate a microservice extension 266. The microservice extension 266 supplements the first API to complete the second task. Supplementing the first API comprises generating a second endpoint for the first API.

In some embodiments, resource processing subsystem 114 may determine a threshold for resource similarity. The threshold may include a level of similarity that indicates when a set of resources (e.g., resources 264) should be utilized to generate a microservice extension (e.g., microservice extension 266).

In some embodiments, the system may deploy a second API. For example, communication subsystem 112 may receive, from the user device, a third request using communication paths 328, 330, and 332. The third request may include a third set of resources and a third task to be completed. The third set of resources does not overlap within a threshold from the first set of resources (e.g., resources 262). Based on the required set of resources from the domain model (e.g., domain model 260), model management subsystem 116 may generate an endpoint for a second API for the third request. Model management subsystem 116 may deploy the second API to access the service module (e.g., service module 406) to complete the third task. The second API and the first API communicate with each other.

In some embodiments, the system may remove a duplicate set of resources. For example, in response to deploying the second API, model management subsystem 116 may analyze associated resource identifiers and parameters to assess a similarity between the first set of resources (e.g., resources 262 or resources 210) and the second set of resources (e.g., resources 264). Based on the analysis, the system may detect a duplicate set of resources. In response to detecting the duplicate set of resources, the system may remove the duplicate set of resources. In some embodiments, when removing the duplicate set of resources, model management subsystem 116 may update the second API by removing the endpoint for a second API and updating the associated resource identifiers and parameters.

In some embodiments, the system may generate a first notification. For example, model management subsystem 116 may generate a first test. The first test verifies the system generates a first response for the first request. In response to verifying the system generates the first response, model management subsystem 116 may verify the system generates a second response for the second request (e.g., request 258). Model management subsystem 116 may generate a second test. The second test verifies both the first API and a second API access the service module. In response to determining the first API or the second API does not access the service module (e.g., service module 406), model management subsystem 116 may generate a first notification to the user device (e.g., user device 254). The first notification may include results of the second test.

In some embodiments, the system may generate a second notification. For example, the model management subsystem 116 may generate a first test. The first test verifies the system generates a first response for the first request. In response to verifying the system generates the first response, model management subsystem 116 may verify the system generates a second response for the second request (e.g., request 258). Model management subsystem 116 may compare the first response and the second response. In response to determining the first response and second response are identical, model management subsystem 116 may generate a second notification to the user device (e.g., user device 254). The second notification may include the results of the comparison.

In some embodiments, the system may collect real-time performance metrics. For example, communication subsystem 112 may transmit a command to collect real-time performance metrics using communication paths 328, 330, and 332. The real-time performance metrics may include response times, error rates, and utilization rate. Based on the performance metrics not reaching a threshold, model management subsystem 116 may generate an alert.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a domain model comprising a resource module and a service module, wherein the service module includes code for microservice functions for the domain model;
receiving, from a user device, a first request comprising a first set of resources and a first task to be completed; retrieving, from the domain model, a required set of resources corresponding to the first set of resources that a first API requires access to complete the first task, wherein the first API is configured to complete the first task; based on the required set of resources from the domain model, generating a template for the first API; based on the template, generating a first endpoint for the first API for providing input to the first API; deploying the first endpoint for the first API to complete the first task, wherein the first API accesses one or more microservice functions from the service module at execution of the first task; receiving, from the user device, a second request, wherein the second request comprises a second set of resources and a second task to be completed, and wherein the second set of resources is overlapping within a threshold to the first set of resources; and based on the second request, generating a microservice extension, wherein the microservice extension supplements the first API to complete the second task, wherein supplementing the first API comprises generating a second endpoint for the first API and updating a data access layer.
2. A method comprising: receiving a domain model comprising a resource module and a service module, wherein the service module includes code for microservice functions for the domain model;
receiving, from a user device, a first request comprising a first set of resources and a first task to be completed; retrieving, from the domain model, a required set of resources corresponding to the first set of resources that a first API requires access to complete the first task, wherein the first API is configured to complete the first task; based on the required set of resources from the domain model, generating a template for the first API; based on the template, generating a first endpoint for the first API; and deploying the first endpoint for the first API to complete the first task, wherein the first API accesses one or more microservice functions from the service module at execution of the first task.
3. A method comprising: receiving, from a user device, a first request comprising a first set of resources and a first task to be completed; retrieving, from a domain model, a required set of resources corresponding to the first set of resources that a first API requires access to complete the first task, wherein the first API is configured to complete the first task, and wherein the domain model comprises a resource module and a service module; based on the required set of resources from the domain model, generating a template for the first API; based on the template, generating a first endpoint for the first API; and deploying the first endpoint for the first API to complete the first task, wherein the first API accesses one or more microservice functions from the service module at execution of the first task.
4. The method of any one of the preceding embodiments, further comprising: receiving, from the user device, a second request, wherein the second request comprises a second set of resources and a second task to be completed, and wherein the second set of resources is overlapping within a threshold to the first set of resources; and based on the second request, generating a microservice extension, wherein the microservice extension supplements the first API to complete the second task, wherein supplementing the first API comprises generating a second endpoint for the first API and updating a data access layer.
5. The method of any one of the preceding embodiments, further comprising: receiving, from the user device, a third request, wherein the third request comprises a third set of resources and a third task to be completed, and wherein the third set of resources does not overlap within a threshold from the first set of resources; based on the required set of resources from the domain model, generating an endpoint for a second API for the third request; and deploying the second API to access the service module to complete the third task, wherein the second API and the first API communicate with each other.
6. The method of any one of the preceding embodiments, wherein generating a first endpoint for the first API further comprises: identifying and validating resources based on the first set of resources, wherein the first set of resources comprises resource identifiers and parameters for the first request; extracting the resource identifiers and parameters for the first request from the first set of resources; based on the resource identifiers and parameters for the first request, generating the first endpoint according to a predefined configuration from the template; transmitting first API requests based on the first request and parsing first API responses for retrieved data; and mapping the retrieved data to the resource module.
7. The method of any one of the preceding embodiments, wherein identifying and validating resources based on the first set of resources further comprises determining a type of resource as an object resource, a singleton resource, or a functional resource.
8. The method of any one of the preceding embodiments, further comprising: generating a first test, wherein the first test verifies the system generates a first response for the first request; in response to verifying the system generates the first response, verifying the system generates a second response for the second request; generating a second test, wherein the second test verifies both the first API and a second API access the service module; and in response to determining the first API or the second API does not access the service module, generating a first notification to the user device, wherein the first notification comprises results of the second test.

9. The method of any one of the preceding embodiments, further comprising: generating a first test, wherein the first test verifies the system generates a first response for the first request; in response to verifying the system generates the first response, verifying the system generates a second response for the second request; comparing the first response and the second response; in response to determining the first response and second response are identical, generating a second notification to the user device, wherein the second notification comprises results of the comparison.

10. The method of any one of the preceding embodiments, wherein deploying the first API to access the service module to complete the first task further comprises retrieving predefined processing rules for requests from the user device.

11. The method of any one of the preceding embodiments, further comprising: in response to deploying the second API, analyzing associated resource identifiers and parameters to assess a similarity between the first set of resources and the second set of resources; based on the analysis, detecting a duplicate set of resources; and in response to detecting the duplicate set of resources, removing the duplicate set of resources.

12. The method of any one of the preceding embodiments, wherein removing the duplicate set of resources further comprises updating the second API by removing the endpoint for a second API and updating the associated resource identifiers and parameters.

13. The method of any one of the preceding embodiments, further comprising: transmitting a command to collect real-time performance metrics, wherein the real-time performance metrics comprise response times, error rates, and utilization rate; and based on the performance metrics not reaching a threshold, generating an alert.

14. The method of any one of the preceding embodiments, further comprising: determining a threshold for resource similarity, wherein the threshold comprises a level of similarity that indicates when a set of resources should be utilized to generate a microservice extension.

15. One or more tangible, non-transitory, computer-readable media storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

What is claimed is:

1. A system for a shared common microservice, comprising:

one or more processors; and one or more non-transitory, computer-readable media storing instructions that, when executed by the one or more processors, cause operations comprising:

receiving a domain model comprising a resource module and a service module, wherein the service module includes code for microservice functions for the domain model;

receiving, from a user device, a first request comprising a first set of resources and a first task to be completed;

retrieving, from the domain model, a required set of resources corresponding to the first set of resources that a first API requires access to complete the first task, wherein the first API is configured to complete the first task;

based on the required set of resources from the domain model, generating a template for the first API;

based on the template, generating a first endpoint for the first API for providing input to the first API;

deploying the first endpoint for the first API to complete the first task, wherein the first API accesses one or more microservice functions from the service module at execution of the first task;

receiving, from the user device, a second request, wherein the second request comprises a second set of resources and a second task to be completed, and wherein the second set of resources is overlapping within a threshold to the first set of resources; and based on the second request, generating a microservice extension, wherein the microservice extension supplements the first API to complete the second task, wherein supplementing the first API comprises generating a second endpoint for the first API and updating a data access layer.

2. A method for a shared common microservice, the method comprising:

receiving a domain model comprising a resource module and a service module, wherein the service module includes code for microservice functions for the domain model;

receiving, from a user device, a first request comprising a first set of resources and a first task to be completed;

retrieving, from the domain model, a required set of resources corresponding to the first set of resources that a first API requires access to complete the first task, wherein the first API is configured to complete the first task;

based on the required set of resources from the domain model, generating a template for the first API;

based on the template, generating a first endpoint for the first API; and deploying the first endpoint for the first API to complete the first task, wherein the first API accesses one or more microservice functions from the service module at execution of the first task.

3. The method of claim 2, further comprising:

receiving, from the user device, a second request, wherein the second request comprises a second set of resources and a second task to be completed, and wherein the second set of resources is overlapping within a threshold to the first set of resources; and based on the second request, generating a microservice extension, wherein the microservice extension supplements the first API to complete the second task, wherein supplementing the first API comprises generating a second endpoint for the first API and updating a data access layer.

4. The method of claim 3, further comprising:

determining a threshold for resource similarity, wherein the threshold comprises a level of similarity that indicates when a set of resources should be utilized to generate a microservice extension.

5. The method of claim 2, further comprising:

receiving, from the user device, a third request, wherein the third request comprises a third set of resources and a third task to be completed, and wherein the third set of resources does not overlap within a threshold from the first set of resources;

based on the required set of resources from the domain model, generating an endpoint for a second API for the third request; and deploying the second API to access the service module to complete the third task, wherein the second API and the first API communicate with each other.

6. The method of claim 5, further comprising:

in response to deploying the second API, analyzing associated resource identifiers and parameters to assess a similarity between the first set of resources and the second set of resources;

based on the analyzing, detecting a duplicate set of resources; and in response to detecting the duplicate set of resources, removing the duplicate set of resources.

7. The method of claim 6, wherein removing the duplicate set of resources further comprises updating the second API by removing the endpoint for a second API and updating the associated resource identifiers and parameters.

8. The method of claim 2, wherein generating a first endpoint for the first API further comprises:

identifying and validating resources based on the first set of resources, wherein the first set of resources comprises resource identifiers and parameters for the first request;

extracting the resource identifiers and parameters for the first request from the first set of resources;

based on the resource identifiers and parameters for the first request, generating the first endpoint according to a predefined configuration from the template;

transmitting first API requests based on the first request and parsing first API responses for retrieved data; and mapping the retrieved data to the resource module.

9. The method of claim 8, wherein identifying and validating resources based on the first set of resources further comprises determining a type of resource as an object resource, a singleton resource, or a functional resource.

10. The method of claim 2, further comprising:

generating a first test, wherein the first test verifies a first response for the first request is generated;

in response to verifying the first response is generated, verifying a second response for the second request is generated;

generating a second test, wherein the second test verifies both the first API and a second API access the service module; and in response to determining the first API or the second API does not access the service module, generating a first notification to the user device, wherein the first notification comprises results of the second test.

11. The method of claim 2, further comprising:

generating a first test, wherein the first test verifies a first response for the first request is generated;

in response to verifying the first response is generated, verifying a second response for the second request is generated;

comparing the first response and the second response;

in response to determining the first response and second response are identical, generating a second notification to the user device, wherein the second notification comprises results of the comparing.

12. The method of claim 2, wherein deploying the first API to access the service module to complete the first task further comprises retrieving predefined processing rules for requests from the user device.

13. The method of claim 2, further comprising:

transmitting a command to collect real-time performance metrics, wherein the real-time performance metrics comprise response times, error rates, and utilization rate; and based on the performance metrics not reaching a threshold, generating an alert.

14. One or more non-transitory, computer-readable storage media storing instructions that, when executed by one or more processors, cause operations comprising:

receiving, from a user device, a first request comprising a first set of resources and a first task to be completed;

retrieving, from a domain model, a required set of resources corresponding to the first set of resources that a first API requires access to complete the first task, wherein the first API is configured to complete the first task, and wherein the domain model comprises a resource module and a service module;

based on the required set of resources from the domain model, generating a template for the first API;

based on the template, generating a first endpoint for the first API; and deploying the first endpoint for the first API to complete the first task, wherein the first API accesses one or more microservice functions from the service module at execution of the first task.

15. The one or more non-transitory, computer-readable storage media of claim 14, wherein the instructions further cause the one or more processors to perform operations comprising:

receiving, from the user device, a second request, wherein the second request comprises a second set of resources and a second task to be completed, and wherein the second set of resources is overlapping within a threshold to the first set of resources; and based on the second request, generating a microservice extension, wherein the microservice extension supplements the first API to complete the second task, wherein supplementing the first API comprises generating a second endpoint for the first API and updating a data access layer.

16. The one or more non-transitory, computer-readable storage media of claim 14, wherein the instructions further cause the one or more processors to perform operations comprising:

receiving, from the user device, a third request, wherein the third request comprises a third set of resources and a third task to be completed, and wherein the third set of resources does not overlap within a threshold from the first set of resources;

based on the required set of resources from the domain model, generating an endpoint for a second API for the third request; and deploying the second API to access the service module to complete the third task, wherein the second API and the first API communicate with each other.

17. The one or more non-transitory, computer-readable storage media of claim 14, wherein the instructions further cause the one or more processors to perform operations comprising:

generating a first test, wherein the first test verifies a first response for the first request is generated;

in response to verifying the first response is generated, verifying a second response for the second request is generated;

generating a second test, wherein the second test verifies both the first API and the second API access the service module; and in response to determining the first API or the second API does not access the service module, generating a first notification to the user device, wherein the first notification comprises results of the second test.

18. The one or more non-transitory, computer-readable storage media of claim 14, wherein the instructions further cause the one or more processors to perform operations comprising:

generating a first test, wherein the first test verifies a first response for the first request is generated;

in response to verifying the first response is generated, verifying a second response for the second request is generated;

comparing the first response and the second response;

in response to determining the first response and second response are identical, generating a second notification to the user device, wherein the second notification comprises results of the comparing.

19. The one or more non-transitory, computer-readable storage media of claim 14, wherein the instructions further cause the one or more processors to perform operations comprising:

transmitting a command to collect real-time performance metrics, wherein the real-time performance metrics comprise response times, error rates, and utilization rate; and based on the performance metrics not reaching a threshold, generating an alert.

20. The one or more non-transitory, computer-readable storage media of claim 14, wherein deploying the first API to access the service module to complete the first task further causes the one or more processors to perform operations comprising, retrieving predefined processing rules for requests from the user device.

* * * * *